(12) United States Patent
Xing et al.

(10) Patent No.: US 11,920,594 B2
(45) Date of Patent: Mar. 5, 2024

(54) SCREW COMPRESSOR SLIDE VALVE AND SCREW COMPRESSOR WITH GAS PULSATION ATTENUATION FUNCTION

(71) Applicant: XI'AN JIAOTONG UNIVERSITY, Shaanxi (CN)

(72) Inventors: Ziwen Xing, Shaanxi (CN); Minglong Zhou, Shaanxi (CN); Wenqing Chen, Shaanxi (CN); Chuang Wang, Shaanxi (CN); Zhilong He, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 427 days.

(21) Appl. No.: 17/277,288

(22) PCT Filed: Dec. 26, 2018

(86) PCT No.: PCT/CN2018/124061
§ 371 (c)(1),
(2) Date: Mar. 17, 2021

(87) PCT Pub. No.: WO2020/056982
PCT Pub. Date: Mar. 26, 2020

(65) Prior Publication Data
US 2022/0042510 A1 Feb. 10, 2022

(30) Foreign Application Priority Data

Sep. 17, 2018 (CN) .......................... 201811083748.7
Sep. 17, 2018 (CN) .......................... 201821518847.9

(51) Int. Cl.
*F04C 29/00* (2006.01)
*F04C 18/16* (2006.01)
(Continued)

(52) U.S. Cl.
CPC .......... *F04C 29/0035* (2013.01); *F04C 18/16* (2013.01); *F04C 28/12* (2013.01); *F16K 3/26* (2013.01); *F04C 2250/102* (2013.01)

(58) Field of Classification Search
CPC ...... F04C 29/0035; F04C 28/12; F04C 18/16; F04C 2250/102; F16K 3/26
See application file for complete search history.

(56) References Cited

U.S. PATENT DOCUMENTS 4,025,244 A * 5/1977 Sato ...................... F04C 28/125
418/87
4,575,323 A * 3/1986 Yoshimura ............ F04C 28/125
417/440

(Continued)

*Primary Examiner* — Christopher S Bobish (57) ABSTRACT

A screw compressor slide valve with gas pulsation attenuation function includes valve walls and internal through holes. A screw compressor includes the screw compressor slide valve. A part of exhausted gas of the screw compressor is directly discharged from an exhaust port to an exhaust chamber to form a main exhaust flow channel; another part of the exhausted gas is discharged from the exhaust port into the exhaust chamber after being delayed by the internal through holes, which forms a branched exhaust flow channel. Since the branched exhaust flow channel is longer than the main exhaust flow channel, when the gas pulsation in the branched exhaust flow channel lags behind that in the main exhaust flow channel by 180-degree in phase, two gas pulsations in the two flow channels are offset due to opposite gas pulsation phases, which attenuates the gas pulsation, thereby suppressing induced vibration and noise.

8 Claims, 4 Drawing Sheets

(51) Int. Cl.
*F04C 28/12* (2006.01)
*F16K 3/26* (2006.01)

(56) References Cited

U.S. PATENT DOCUMENTS

| | | | |
|---|---|---|---|
| 6,302,668 B1* | 10/2001 | Lee | F04C 28/12 |
| | | | 418/201.2 |
| 8,221,104 B2* | 7/2012 | Wilson | F04C 28/12 |
| | | | 417/310 |
| 8,459,963 B2* | 6/2013 | Pileski | F04C 29/0035 |
| | | | 418/201.2 |
| 11,365,736 B2* | 6/2022 | Bi | F04C 28/12 |
| 2020/0291942 A1* | 9/2020 | Yang | F04C 18/0238 |
| 2021/0131434 A1* | 5/2021 | Broglia | F04C 18/16 |

* cited by examiner

SCREW COMPRESSOR SLIDE VALVE AND SCREW COMPRESSOR WITH GAS PULSATION ATTENUATION FUNCTION

CROSS REFERENCE OF RELATED APPLICATION

This is a U.S. National Stage under 35 U.S.C 371 of the International Application PCT/CN2018/124061, filed Dec. 26, 2018, which claims priority under 35 U.S.C. 119(a-d) to CN 201811083748.7, filed Sep. 17, 2018 and CN 201821518847.9, filed Sep. 17, 2018.

BACKGROUND OF THE PRESENT INVENTION

Field of Invention

The present invention relates to the field of vibration and noise reduction technology of fluid machinery, and more particularly to a screw compressor slide valve with gas pulsation attenuation function.

Description of Related Arts

As a general equipment for increasing gas pressure and conveying gas, screw compressors have been widely used in petroleum, natural gas, chemical industry, metallurgy and other fields. The screw compressor is a rotary positive displacement compressor. Driven by the motor, the male rotor and the female rotor are engaged with each other and rotate synchronously, leading to a periodic change in the volume of the formed working chamber, thereby realizing the working processes of suction, compression, and exhaust. The periodic suction and exhaust of the screw compressor lead to periodic fluctuations of gas pressure and flow rate in the exhaust chamber, resulting in gas pulsation. The gas pulsation of the screw compressor not only reduces the volumetric efficiency of the screw compressor and increases the power consumption of the screw compressor, but also induces vibration and noise.

The U.S. Pat. No. 8,459,963 B2 discloses a gas pulsation attenuation device for screw compressors, which utilizes the internal chamber of the slide valve to design a gas pulsation attenuation cavity, and adjusts the resonant frequency of the attenuation cavity through the diameter, length and quantity of perforations to achieve attenuation of exhaust gas pulsation of screw compressor. In this patent, since the screw compressor needs to spray a small amount of lubricating medium such as lubricating oil or water for lubrication during operation, the lubricating medium enters the attenuation cavity together with the exhausted gas of the screw compressor. Due to the accumulation of lubricating medium, the effective attenuation volume of the attenuation cavity is changed, the attenuation frequency is shifted, and the attenuation effect of gas pulsation decreases. As time goes by, the lubricating medium continues to increase. When the height of the accumulated lubricating medium is higher than the lowest position of the axial perforation of the slide valve, the lubricating medium will be discharged from the attenuation cavity to the exhaust cavity through the perforation, so that due to the existence of the lubricating medium, the effective cross-sectional area of the perforation is affected, and the resonant frequency of the attenuation cavity is ultimately affected, resulting in a decrease in the attenuation effect of gas pulsation.

SUMMARY OF THE PRESENT INVENTION

The present invention aims to solve the problem of gas pulsation in the exhaust process of the screw compressor from the exhaust source, and to provide a screw compressor slide valve and a screw compressor with gas pulsation attenuation function, which are able to suppress the exhaust gas pulsation of the screw compressor, thus reducing the vibration and noise induced by the gas pulsation.

To achieve the object mentioned above, the present invention provides technical solutions as follows.

A screw compressor slide valve with gas pulsation attenuation function comprises a valve body, wherein the valve body comprises multiple valve walls located at a circumferential direction of the valve body and used for forming seal with a compressor body, a male rotor and a female rotor of a screw compressor, respectively; on an exhaust side end surface of the valve body, there are two or more internal through holes extending to a suction side end surface of the valve body, and each one of the two or more internal through holes is connected with at least one of a rest of the two or more internal through holes.

A screw compressor with gas pulsation attenuation function comprises a compressor body, a male rotor and a female rotor both of which are provided within the compressor body and engaged with each other, and a screw compressor slide valve for controlling exhaust gas, wherein the screw compressor slide valve comprises a valve body, the valve body comprises multiple valve walls located at a circumferential direction of the valve body and used for forming seal with the compressor body, the male rotor and the female rotor of the screw compressor, respectively; on an exhaust side end surface of the valve body, there are two or more internal through holes extending to a suction side end surface of the valve body, and each one of the two or more internal through holes is connected with at least one of a rest of the two or more internal through holes.

Preferably, a cross section of each of the internal through holes is circular, rectangular or elliptical.

Preferably, two of the internal through holes are connected with each other through a through hole connecting groove which is provided at the suction side end surface of the valve body; the through hole connecting groove and the two of the internal holes which are connected with each other by the through hole connecting groove form a branched exhaust flow channel; a length of the branched exhaust flow channel is an odd multiple of a ½ wavelength corresponding to a frequency of gas pulsation to be attenuated of the screw compressor.

Preferably, a threaded hole is provided in the suction side end surface of the valve body, a slide valve hydraulic plug is provided in the threaded hole, an opening of the internal through holes which is provided on the suction side end surface of the valve body and the through hole connecting groove are sealed within the threaded hole through the slide valve hydraulic plug.

Preferably, the screw compressor slide valve further comprises a slide valve connecting rod which is axially movable and connected with the valve body at the exhaust side end surface thereof.

Beneficial effects of the present invention are as follows.

The present invention is designed based on the principle of acoustic interference. While a part of the exhausted gas of the screw compressor is directly discharged from the exhaust port into the exhaust chamber, which forms a main exhaust flow channel; another part of the exhausted gas of the screw compressor is discharged from the exhaust port into the exhaust chamber after being delayed by a gas channel formed by the internal through holes of the valve body, which forms a branched exhaust flow channel. Through the length difference between the main exhaust flow channel and the branched exhaust flow channel, the attenuation of the gas pulsation of the screw compressor is able to be achieved. The attenuation effect of gas pulsation in the present invention is only related to the length of the internal through holes of the screw compressor slide valve, which solves the influence of the content of the lubricating medium in the exhausted gas on the attenuation effect of gas pulsation. Moreover, the screw compressor slide valve is simple in structure, less in pressure loss and strong in manufacturing and installation operability, and is able to effectively reduce the vibration and noise of the screw compressor.

Further, by optimizing the length difference between the branched exhaust flow channel and the main exhaust flow channel, the time difference, between the branched gas pulsation in the branched exhaust flow channel and the main gas pulsation in the main exhaust flow channel, is changed to make the time difference half a cycle of the gas pulsation to be attenuated, i.e., the phase difference between the main gas pulsation and the branched gas pulsation is 180-degree, thus the branched gas pulsation in the branched exhaust flow channel and the main gas pulsation in the main exhaust flow channel are offset due to opposite gas pulsation phases, improving the attenuation effect of gas pulsation of the screw compressor.

In the drawings, 1: gas inlet; 2: compressor body; 3: motor stator; 4: motor rotor; 5: male rotor; 6: female rotor; 7: exhaust bearing seat; 8: exhaust pipe; 9: exhaust gas-oil separation barrel; 10: gas-oil separation filter; 11: gas outlet; 20: screw compressor slide valve; 21: valve wall; 22: slide valve connecting rod; 23: slide valve hydraulic plug; 24: internal through hole; 25: through hole connecting groove; 26: valve body; 27: threaded hole; 31: main exhaust flow channel; 32: branched exhaust flow channel.

DETAILED DESCRIPTION OF THE PREFERRED EMBODIMENT

The present invention is further explained in detail with drawings and embodiments as follows.

Figure 1:
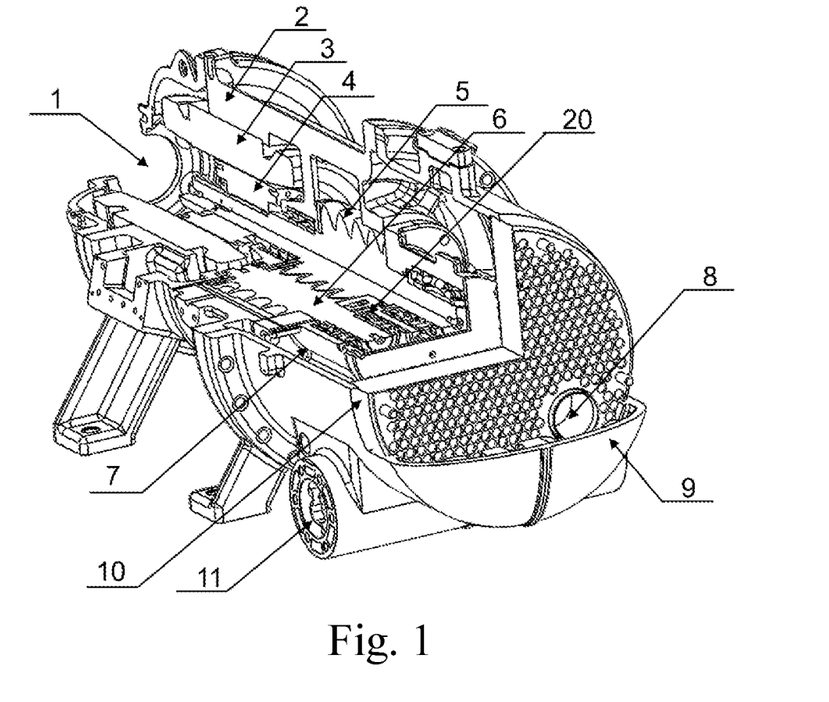
FIG. 1 is a three-dimensional structure diagram of a screw compressor provided by the present invention.

Referring to FIG. 1, gas enters a suction section of a screw compressor through a gas inlet 1, and then enters a gas suction chamber of a compressor body 2 through a gap between the compressor body 2 and a motor stator 3 and a gap between the motor stator 3 and a motor rotor 4. Under an engagement action of a male rotor 5 and a female rotor 6, the gas is compressed to an exhaust section of the screw compressor, and then enters an exhaust chamber from an exhaust port through an exhaust bearing seat 7, and then is discharged into an exhaust gas-oil separation barrel 9 through an exhaust pipe 8, and then is performed gas-oil separation by a gas-oil separation filter 10 which is provided within the exhaust gas-oil separation barrel 9, and finally is discharged from a gas outlet 11. An exhaust gas displacement of the screw compressor is adjusted through an axial movement of a screw compressor slide valve 20. The exhaust gas pulsation of the screw compressor is determined by its working principle, and it is difficult to reduce the gas pulsation in an engagement process of the male rotor and the female rotor of the screw compressor. Therefore, in the exhaust process of the screw compressor, the gas pulsation is attenuated from an exhaust source (i.e., the exhaust port) to control vibration and noise of the screw compressor induced by the gas pulsation, which is the best choice to solve the vibration and noise of the screw compressor.

The present invention utilizes the screw compressor slide valve which is provided at the exhaust port of the screw compressor to attenuate the gas pulsation, which attenuates the gas pulsation of the screw compressor to the maximum extent from the exhaust source, thus improving the vibration and noise of the screw compressor.

Figures 2A, 2B:
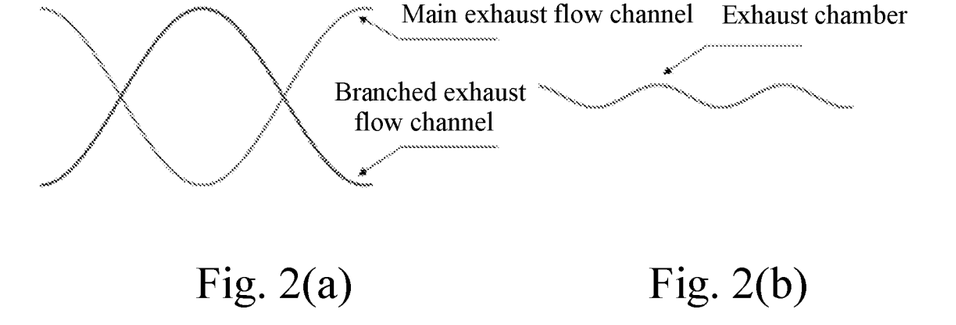
FIG. 2(a) shows gas pulsation in each flow channel before attenuation.
FIG. 2(b) shows gas pulsation in an exhaust chamber after attenuation.
Figure 3:
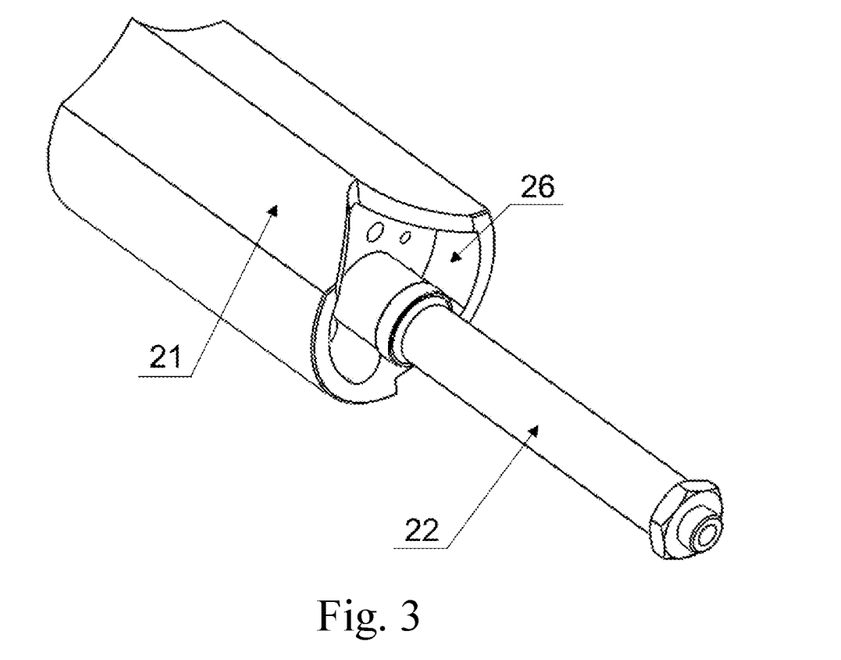
FIG. 3 is a three-dimensional structure diagram of a screw compressor slide valve (with a branched exhaust flow channel) provided by the present invention.
Figure 4:
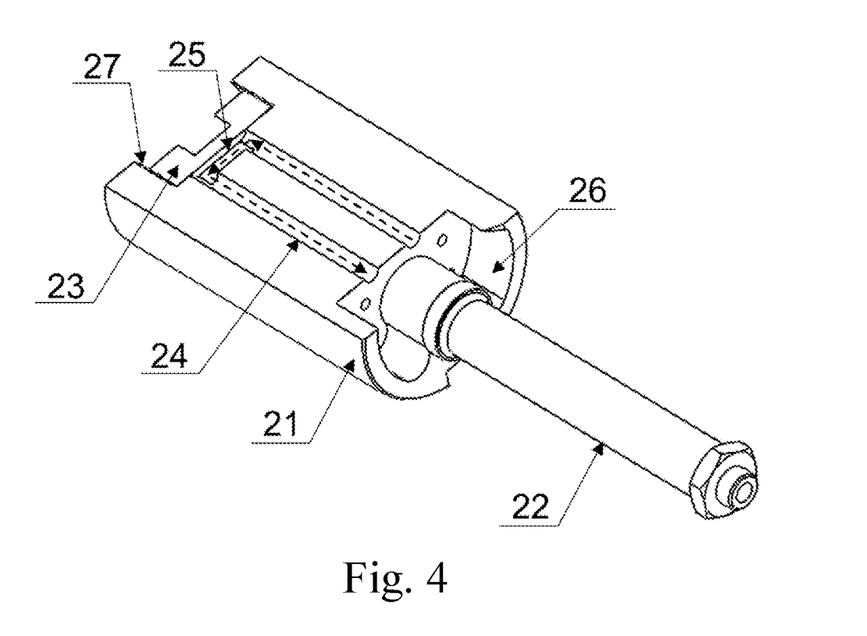
FIG. 4 is a partial sectional view of the screw compressor slide valve shown in FIG. 3.

Referring to FIG. 2, the screw compressor slide valve provided by the present invention thoroughly considers the periodic characteristics of exhaust gas pulsation of the screw compressor, and fully considers the problem of equipment installation space. Based on the basic principle of acoustic interference, through the structural design of the screw compressor slide valve, a main exhaust flow channel and a branched exhaust flow channel both of which have different lengths are formed between the exhaust port and an exhaust chamber, two gas pulsations with opposite gas pulsation phases in the main exhaust flow channel and the branched exhaust flow channel are superimposed and offset, thus attenuating the gas pulsation of the screw compressor to the maximum extent. Specifically, due to a length of the main exhaust flow channel is shorter than a length of the branched exhaust flow channel, the exhausted gas with a certain gas pulsation (i.e., pressure fluctuation) is controlled by the screw compressor slide valve, a part of the exhausted gas firstly reaches the exhaust chamber through the main exhaust flow channel, another part of the exhausted gas is delayed by the branched exhaust flow channel and then reaches the exhaust chamber. When the another part of the exhausted gas in the branched exhaust flow channel reaches the exhaust chamber, its gas pulsation lags behind the part of the exhausted gas which reaches the exhaust chamber through the main exhaust flow channel in phase. When the gas pulsation of the another part of the exhausted gas (referred to as branched gas pulsation), which reaches the exhaust chamber through the branched exhaust flow channel, lags behind the gas pulsation of the part of the exhausted gas (referred to as main gas pulsation), which reaches the exhaust chamber through the main exhaust flow channel by 180 degrees in phase, the another part of the exhausted gas and the part of the exhausted gas from different flow channels in the exhaust chamber are offset due to opposite gas pulsation phases, thus achieving the active attenuation of gas pulsation of the screw compressor. Because the transmission of sound waves is periodic, when the branched gas pulsation lags behind the main gas pulsation by an odd multiple of 180 degrees in phase, the another part of the exhausted gas and the part of the exhausted gas from different flow channels in the exhaust chamber are also offset due to opposite gas pulsation phases, thus achieving the active attenuation of gas pulsation of the screw compressor.

The length difference between the main exhaust flow channel and the branched exhaust flow channel is determined by a frequency of the gas pulsation, which is specifically as follows.

A fundamental frequency of gas pulsation of the screw compressor is calculated by a formula of:

$$f_1 = m \times \frac{n}{60}, \qquad (1)$$

where $f_1$ is fundamental frequency of gas pulsation of the screw compressor, m is lobe number of the male rotor of the screw compressor and related to screw compressor profile, n is revolution speed of the male rotor of the screw compressor.

A frequency multiplication $f_N$ of gas pulsation of the screw compressor is calculated by a formula of:

$$f_N = N \times f_1, N=1,2,3 \qquad (2).$$

Accordingly, the length difference L between the main exhaust flow channel and the branched exhaust flow channel is calculated by a formula of:

$$\frac{L}{c} = \Delta t = \frac{1}{2} \times \frac{1}{f_1}, \qquad (3)$$

where c is sound velocity of fluid medium, $\Delta t$ is time difference between the main gas pulsation and the branched gas pulsation.

When $$L = \frac{c}{2} \times \frac{1}{f_1},$$

that is, when the branched gas pulsation lags behind the main gas pulsation by 180 degrees in phase, the main gas pulsation and the branched gas pulsation are offset due to opposite gas pulsation phases, thereby attenuating the fundamental frequency $f_1$ of gas pulsation of the screw compressor.

When L is determined, that is, $$L = \frac{c}{2} \times \frac{1}{f_1},$$

because the transmission of sound waves is periodic, $$\frac{L}{c} = \frac{1}{2} \times (2M-1) \times \frac{1}{f}, M = 1, 2, 3 \ldots \qquad (4)$$

It is able to be known from formulas (3) and (4) that
when M=1, $f=f_1$;
when M=2, $f=f_3$;
when M=3, $f=f_5$;
. . . .

Therefore, after optimizing the length difference between the main exhaust flow channel and the branched exhaust flow channel by the formula of $$L = \frac{c}{2} \times \frac{1}{f_1},$$

not only the fundamental frequency of gas pulsation of the screw compressor is actively attenuated, but also odd multiples of the fundamental frequency of gas pulsation of the screw compressor are actively attenuated.

Similarly, when $$\frac{L}{c} = \Delta t = \frac{1}{2} \times \frac{1}{f_2},$$

that is, $$L = \frac{c}{2} \times \frac{1}{f_2},$$

not only the double fundamental frequency of gas pulsation of the screw compressor is attenuated, but also odd multiples of the double fundamental frequency of gas pulsation of the screw compressor are attenuated. Through combining $$L = \frac{c}{2} \times \frac{1}{f_1}$$

with $$L = \frac{c}{2} \times \frac{1}{f_2},$$

the gas pulsation of the screw compressor is effectively attenuated to reduce the vibration and noise of the screw compressor.

Referring to FIGS. 3, 4, 5, 6 and 7, the screw compressor slide valve 20 according to the preferred embodiment of the present invention comprises a valve body 26 and a slide valve connecting rod 22, wherein the valve body 26 comprises multiple valve walls for forming seal with the compressor body 2, the male rotor 5 and the female rotor 6, respectively; the multiple valve walls 21 are located at a circumferential direction of the valve body; the valve body 26 is connected with an external drive mechanism through the slide valve connecting rod 22, and adjusts an exhaust gas displacement of the screw compressor by an axial movement itself. The screw compressor slide valve 20 has a branched exhaust flow channel 32 for attenuating the gas pulsation produced during the exhaust process of the screw compressor, wherein the branched exhaust flow channel 32 comprises a pair of internal through holes 24 which extend from an exhaust side end surface to a suction side end surface of the valve body 26, and a through hole connecting groove 25 which is provided at the suction side end surface of the valve body 26 for connecting the pair of internal through holes 24 with each other; a threaded hole 27 is provided in the suction side end surface of the valve body 26 for facilitating processing the through hole connecting groove 25; the threaded hole 27 is sealed by a slide valve hydraulic plug 23, so that the pair of internal through holes 24 and the through hole connecting groove 25 form the branched exhaust flow channel 32, which avoids leakage of the exhausted gas from an exhaust side to a suction side caused by the threaded hole 27. The exhausted gas of the screw compressor has a certain gas pulsation, a part of the exhausted gas is directly discharged from the exhaust port through the exhaust bearing seat 7 to the exhaust chamber for forming the main exhaust flow channel 31, another part of the exhausted gas is discharged from the exhaust port to the exhaust chamber after being delayed by the branched exhaust flow channel 32, which means that the another part of the exhausted gas enters the valve body 26 from one of the pair of internal through holes 24 of the branched exhaust flow channel 32, and then returns to the exhaust side of the valve body 26 from another of the pair of internal through holes 24 of the branched exhaust flow channel 32, and then flows towards the exhaust chamber; according to a specific position of the exhaust port and the screw compressor slide valve, exhausted gas preferentially flows in from one of the pair of internal through holes 24 which is close to the exhaust port with higher pressure, and flows out from another of the pair of internal through holes 24. Since the branched exhaust flow channel 32 is long, the branched gas pulsation in the branched exhaust flow channel 32 lags behind the main gas pulsation in the main exhaust flow channel 31 in phase. When the branched gas pulsation in the branched exhaust flow channel 32 lags behind the main gas pulsation in the main exhaust flow channel 31 by 180 degrees in phase, the branched gas pulsation and the main gas pulsation are attenuated and offset due to opposite gas pulsation phases, so that the gas pulsation of the screw compressor is attenuated, thereby reducing the vibration and noise of the screw compressor. Simultaneously, the internal through holes 24 and the through hole connecting groove 25 allows the exhausted gas and lubricating medium to enter and exit directly, which will not cause the lubricating medium to accumulate in the branched exhaust flow channel 32, so that the inflow and outflow of the lubricating medium must be equal to each other, and occupied equivalent flow channel cross-sectional areas of inflow and outflow of the lubricating medium are also the same. Therefore, the screw compressor slide valve provided by the present invention avoids the influence of content of lubricating medium in the exhausted gas on the attenuation frequency of gas pulsation, so that the influence of content of lubricating medium in the exhausted gas on the attenuation effect of gas pulsation is solved.

According to operating conditions of the screw compressor, the length difference between the main exhaust flow channel 31 and the branched exhaust flow channel 32 is determined to make the gas pulsations in the two flow channels have a 180-degree phase difference in the exhaust chamber, so that the gas pulsations in the two flow channels are attenuated and offset due to opposite gas pulsation phases. Therefore, the exhaust gas pulsation of the screw compressor is attenuated from the exhaust source to reduce the vibration and noise. Because the transmission of sound waves is periodic, when the branched gas pulsation lags behind the main gas pulsation by an odd multiple of 180 degrees in phase, the gas pulsations in the two flow channels are also offset due to opposite gas pulsation phases, thus achieving the active attenuation of gas pulsation of the screw compressor. Therefore, the screw compressor slide valve 20 is able to effectively attenuate the fundamental frequency of gas pulsation and its odd multiple frequencies. In summary, the branched exhaust flow channel 32 is able to effectively attenuate the fundamental frequency of gas pulsation and its odd multiple frequencies (i.e., fundamental frequency, triple frequency and quintuple frequency).

Figure 5:
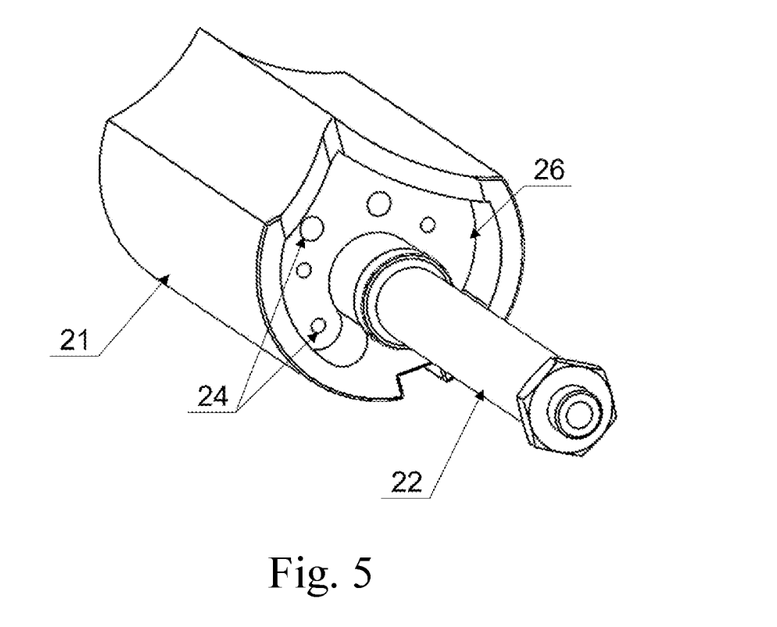
FIG. 5 is a three-dimensional structure diagram of a screw compressor slide valve (with multiple branched exhaust flow channels) provided by the present invention.
Figure 6:
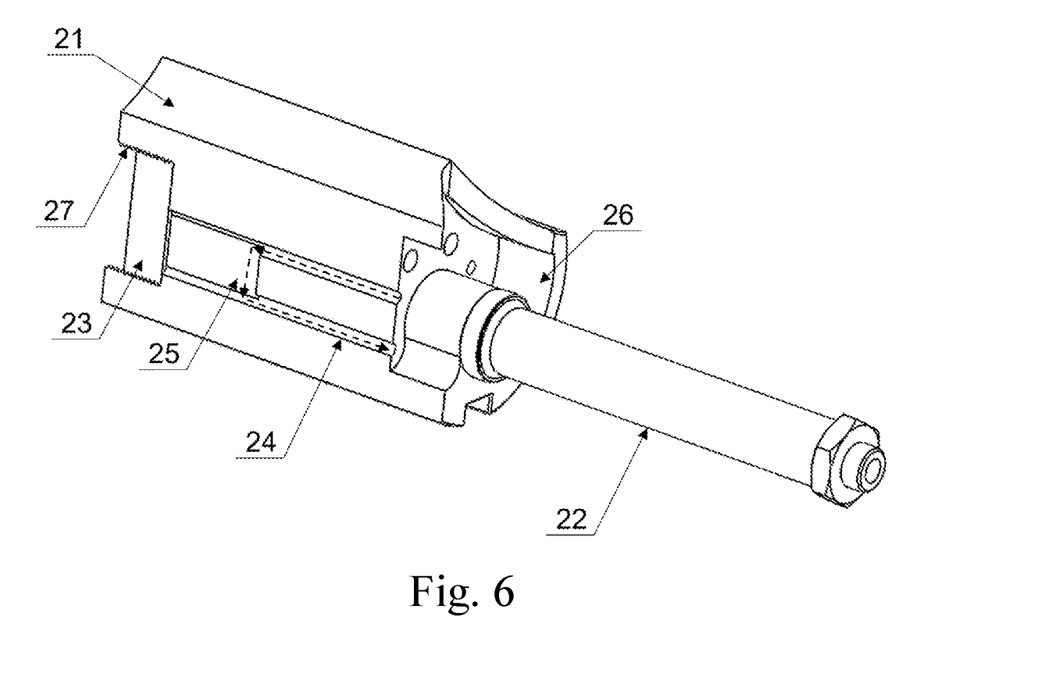
FIG. 6 is a partial sectional view of the screw compressor slide valve shown in FIG. 5.

In order to simultaneously attenuate the fundamental frequency and its odd multiple frequencies, and double frequency and its odd multiple frequencies, the flow of branched exhaust flow channel 32 is increased, such as a quantity of branched exhaust flow channels 32 is increased by an increase of a quantity of internal through holes 24, and the length differences between the increased branched exhaust flow channels 32 and the main exhausted flow channel 31 are changed, such as a length of the through hole connecting groove 25 is changed to change the length difference between the branched exhaust flow channel 32 and the main exhausted flow channel 31, so as to attenuate the double frequency and its odd multiple frequencies of the gas pulsation (i.e., double frequency, sextuple frequency and ten times frequency). Through optimizing the quantity and length of the branched exhaust flow channels 32, the fundamental frequency and its odd multiple frequencies, and the double frequency and its odd multiple frequencies of the screw compressor are able to be simultaneously attenuated.

The working principle of the present invention is described as follows.

Figure 7:
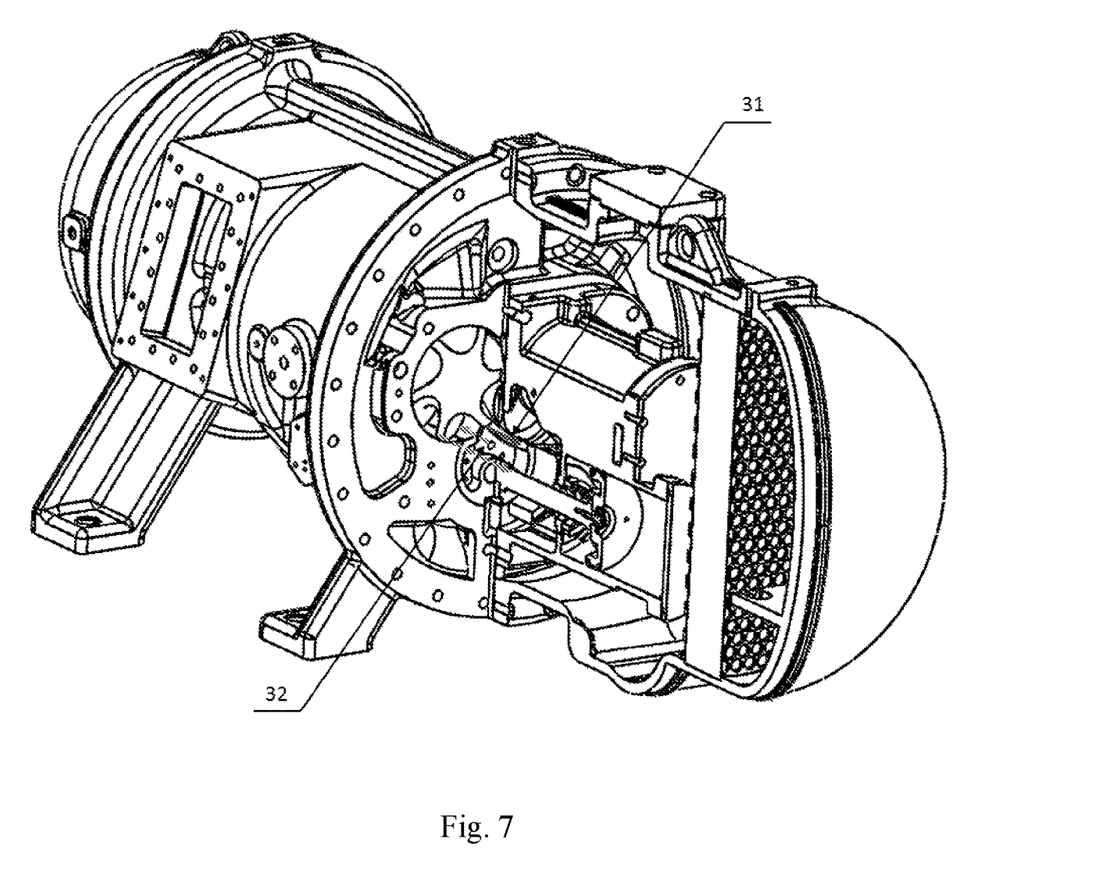
FIG. 7 is a schematic diagram of the screw compressor with the main exhaust flow channel and the branched exhaust flow channel provided by the present invention.

Referring to FIG. 7, the screw compressor slide valve provided by the present invention is a vibration and noise reduction device, which is able to attenuate the gas pulsation in the exhaust process of the screw compressor from the exhaust source, thereby suppressing vibration excitation caused by the gas pulsation and reduce aerodynamic noise induced by the gas pulsation.

After the suction and compression process, the screw compressor begins to exhaust. The gas after compression is discharged from the exhaust port. A part of the exhausted gas is directly discharged from the main exhaust flow channel 31 through the exhaust bearing seat 7 to the exhaust chamber, another part of the exhausted gas is discharged to the exhaust chamber after being delayed by the branched exhaust flow channel 32 which is formed by the internal through holes 24 in the slide valve. There must be the time difference because of the distance difference between the main exhaust flow channel 31 and the branched exhaust flow channel 32. When the length difference of the main exhaust flow channel 31 and the branched exhaust flow channel 32 is half a cycle of frequency of the gas pulsation to be attenuated (i.e., the phase difference of the two gas pulsations in the two flow channels is 180 degrees), due to the opposite gas pulsation phases, the part of the exhausted gas and the another part of the exhausted gas in the two flow channels are superimposed and attenuated in amplitude, and then are offset, thus reducing the vibration and noise of an exhaust system and a pipeline system of the screw compressor.

In short, the screw compressor slide valve provided by the present invention is able to attenuate the gas pulsation of the screw compressor from the exhaust source; through attenuating the amplitude of gas pulsation of the screw compressor, the vibration and noise of the exhaust system and the pipeline system of the screw compressor caused by gas pulsation is reduced. Moreover, the screw compressor slide valve provided by the present invention is simple in structure, small in volume, less in pressure loss, strong in manufacturing and installation operability, and good in vibration and noise reduction effect.

What is claimed is:

1. A screw compressor slide valve with gas pulsation attenuation function, which comprises a valve body (26), wherein the valve body (26) comprises multiple valve walls (21) located at a circumferential direction of the valve body (26) and used for forming seal with a compressor body (2), a male rotor (5) and a female rotor (6) of a screw compressor, respectively; on an exhaust side end surface of the valve body (26), there are two or more internal through holes (24) extending to a suction side end surface of the valve body (26), and each one of the two or more internal through holes (24) is connected with at least one of a rest of the two or more internal through holes (24);

two of the internal through holes (24) are connected with each other through a through hole connecting groove (25) which is provided at the suction side end surface of the valve body (26); the through hole connecting groove (25) and the two of the internal through holes (24) which are connected with each other through the through hole connecting groove (25) form a branched exhaust flow channel (32); a length of the branched exhaust flow channel (32) is an odd multiple of a ½ wavelength corresponding to a frequency of gas pulsation to be attenuated of the screw compressor.

2. The screw compressor slide valve with gas pulsation attenuation function according to claim 1, wherein a cross section of each of the internal through holes (24) is circular, rectangular or elliptical.

3. The screw compressor slide valve with gas pulsation attenuation function according to claim 1, wherein a threaded hole (27) is provided in the suction side end surface of the valve body (26), a slide valve hydraulic plug (23) is provided in the threaded hole (27), an opening of the internal through holes (24) which is provided on the suction side end surface of the valve body (26) and the through hole connecting groove (25) are sealed within the threaded hole (27) through the slide valve hydraulic plug (23).

4. The screw compressor slide valve with gas pulsation attenuation function according to claim 1, further comprising a slide valve connecting rod (22) which is axially movable and connected with the valve body (26) at the exhaust side end surface thereof.

5. A screw compressor with gas pulsation attenuation function, which comprises a compressor body (2), a male rotor (5) and a female rotor (6) both of which are provided within the compressor body (2) and engaged with each other, and a screw compressor slide valve (20) for controlling gas exhaust, wherein the screw compressor slide valve (20) comprises a valve body (26), the valve body (26) comprises multiple valve walls (21) located at a circumferential direction of the valve body (26) and used for forming seal with the compressor body (2), the male rotor (5) and the female rotor (6) of the screw compressor, respectively; on an exhaust side end surface of the valve body (26), there are two or more internal through holes (24) extending to a suction side end surface of the valve body (26), and each one of the two or more internal through holes (24) is connected with at least one of a rest of the two or more internal through holes (24);

two of the internal through holes (24) are connected with each other through a through hole connecting groove (25) which is provided at the suction side end surface of the valve body (26); the through hole connecting groove (25) and the two of the internal through holes (24) which are connected with each other through the through hole connecting groove (25) form a branched exhaust flow channel (32); a length of the exhaust flow channel (32) is an odd multiple of a ½ wavelength corresponding to a frequency of gas pulsation to be attenuated of the screw compressor.

6. The screw compressor with gas pulsation attenuation function according to claim 5, wherein a cross section of each of the internal through holes (24) is circular, rectangular or elliptical.

7. The screw compressor with gas pulsation attenuation function according to claim 5, wherein a threaded hole (27) is provided in the suction side end surface of the valve body (26), a slide valve hydraulic plug (23) is provided in the threaded hole (27), an opening of the internal through holes (24) which is provided on the suction side end surface of the valve body (26) and the through hole connecting groove (25) are sealed within the threaded hole (27) through the slide valve hydraulic plug (23).

8. The screw compressor with gas pulsation attenuation function according to claim 5, wherein the slide valve (20) further comprises a slide valve connecting rod (22) which is axially movable and connected with the valve body (26) at the exhaust side end surface thereof.

* * * * *